United States Patent [19]

Musante et al.

[11] Patent Number: 4,634,616

[45] Date of Patent: Jan. 6, 1987

[54] STENCIL ART OVERLAYS

[76] Inventors: Louis P. Musante, 6663 Old Ridge Rd., Fairview, Pa. 16415; Lynda L. Scott, 3082 W. 12th St., Apartment 2, Erie, Pa. 16505

[21] Appl. No.: 824,192

[22] Filed: Jan. 30, 1986

[51] Int. Cl.$^4$ ............................................. G09B 19/20
[52] U.S. Cl. .................................. 428/40; 112/266.1; 206/574; 428/102; 434/95
[58] Field of Search ................ 434/87, 95; 206/574, 206/575; 112/266.1; 428/102, 542.6, 40

[56] References Cited

U.S. PATENT DOCUMENTS

| | | | |
|---|---|---|---|
| 532,110 | 1/1895 | Stockmann | 428/906.6 X |
| 645,440 | 3/1900 | Thruston | 434/95 |
| 1,205,386 | 11/1916 | Perenyi et al. | 434/87 X |
| 1,560,283 | 11/1925 | Mehlem | 428/906.6 X |
| 2,435,068 | 1/1948 | Bellamy | 434/95 X |
| 2,511,947 | 6/1950 | Samuels | 434/95 X |
| 4,154,181 | 5/1979 | Massucci et al. | 112/266.1 |
| 4,310,313 | 1/1982 | Brundige | 434/95 |
| 4,372,238 | 2/1983 | Ciganko | 112/439 |
| 4,404,750 | 9/1983 | Marx et al. | 434/95 X |
| 4,483,265 | 11/1984 | Weidmann | 112/266.1 |
| 4,495,230 | 1/1985 | Ellwein | 434/95 X |
| 4,530,665 | 7/1985 | Colonel | 434/95 |
| 4,568,615 | 2/1986 | Di Vincenzo | 112/266.1 X |

Primary Examiner—Henry F. Epstein
Attorney, Agent, or Firm—Charles L. Lovercheck; Wayne L. Lovercheck; Dale R. Lovercheck

[57] ABSTRACT

A method and materials for sewing craft sheets of plastic canvas is disclosed wherein an adhesive backed transparent film sheet having a grid pattern thereon color coded to form a picture is affixed to a plastic canvas having a grid pattern the same size as the grid pattern on the sheet. The grid on the transparent sheet is aligned with the grid of the plastic canvas and the grid is then cut to the shape of the picture on the transparent sheet. The person can then stitch the picture, following the color code marks on the transparent sheet grid.

5 Claims, 3 Drawing Figures

STENCIL ART OVERLAYS

BACKGROUND OF THE INVENTION

Using Stencil Art Overlays is a technique of art or craft using plastic canvas. Such needlework is ordinarily performed by the operator counting and cutting vertical and horizontal strands (of a grid nature) of a sheet of plastic canvas using a picture printed on paper as a guide, then stitching through the openings of the grid to form a picture or design on the plastic canvas.

REFERENCE TO PRIOR ART

Applicant is aware of the following U.S. Pat. Nos. that relate, either directly or indirectly, to stencil art needlework: 645,440 to Thruston; 1,205,386 to Perenyl; 1,560,283 to Mehlem; 2,435,068 to Bellamy; 2,511,947 to Samuels; 4,310,313 to Brundige; 4,530,665 to Colonel; 4,495,230 to Ellwein.

GENERAL STATEMENT OF THE INVENTION

Applicant has discovered that by providing a picture on a transparent sheet of film, with a grid printed on it, similar to the size of grid of a plastic canvas sheet, and adhesive on one side covered by a backing sheet, the user can affix the film to the canvas or plastic grid referred to as plastic canvas, with the grids printed on the film, color coded, generally coextensive with the grids of the plastic canvas sheet, cut the plastic canvas and film sheet to the shape of the picture or design. Then removing the film, replacing it on the backing sheet and stitching on the plastic canvas, using yarn colors corresponding to the color code on the film, thus providing a picture or design. This provides an improvement in needlework that saves time, provides an efficient process and achieves added interest to the craft work.

OBJECTS OF THE INVENTION

It is an object of the invention to provide an improved method of using stencil art overlays.

Another object of the invention is to provide a method of using stencil art overlays that are simple, efficient and interesting.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

DETAILED DESCRIPTION OF THE INVENTION

Figure 1:
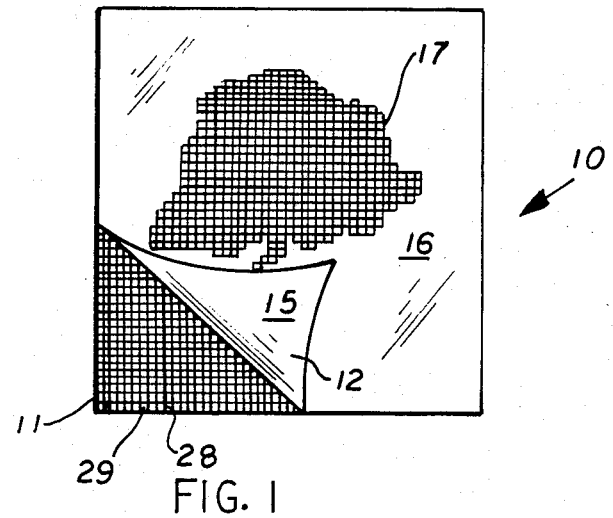
FIG. 1 is a view of a plastic canvas sheet according to the invention, with a film affixed to the grid with a picture on the film sheet, showing the film peeled back to expose the adhesive covered surface.
Figure 2:
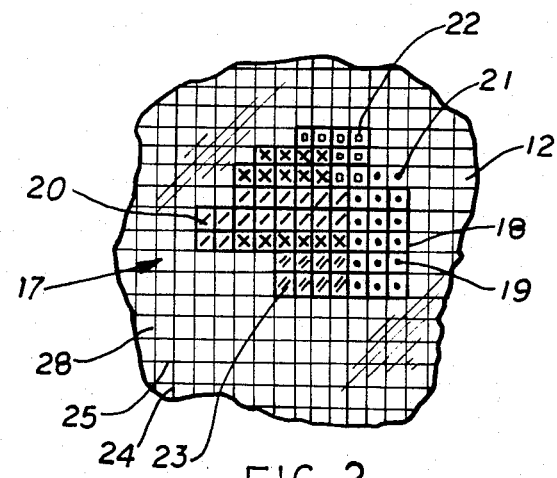
FIG. 2 is a partial view of a transparent sheet film showing an example of the color codes.
Figure 3:
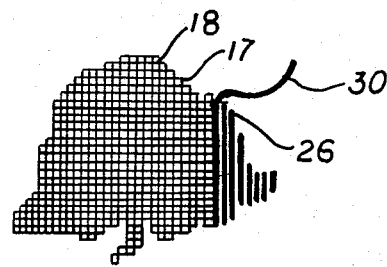
FIG. 3 is a view of the picture in the process of stitching.

Now with more particular reference to the drawing, the kit 10 according to the invention is made up of a transparent sheet of film overlay 12 having one side 15 coated with an adhesive coating secured by a paper backing. The other side 16 has a grid pattern 17 on the transparent sheet with a design or a picture printed on it. By marking the squares of the grid with color code symbols to identify the color of yarn for that square and a grid pattern corresponding to the grid pattern of a specified size of grid of a plastic canvas sheet 11, an efficient interesting process is achieved. To use the film overlay sheet 12, the operator will pull off the paper backing sheet from the sheet of film 12 and affix the film sheet to the plastic canvas sheet 11 by means of the adhesive 15 on the on the side of the film toward the plastic canvas sheet 11. The operator can then cut the plastic canvas sheet 11 to conform to the picture formed on the pattern 17 on the sheet of film 12, then remove the film from the canvas sheet and stitch around the vertical strands 24 and the horizontal strands 25 of the plastic canvas sheet 11 of FIG. 2 and verticle strands 28 and horizontal strands 29 in FIG. 1, thereby providing a neat needlework pattern.

The sheet of transparent material 12 may be made of a transparent film of polyethylene terephthlate sold under the trademark of "Mylar", acetate, polyethylene or any other suitable transparent material and the grid pattern 17 on the film sheet 12 will generally align with the strands forming a specified size of grid of a plastic canvas sheet 11. The grid squares identifying the picture on the sheet of film are highlighted in heavy lines at 18 and the particular squares are color coded for different colors of yarn 30 as a guide to the user. For example, dots 19 on the grid square may refer to red yarn, dashes 20 may refer to yellow yarn, circles 21 to purple yarn, squares 22 refer to orange yarn and double dashes 23 refer to brown yarn, etc.

The steps of the method are as follows: Aligning a sheet of plastic canvas 11, with a picture or design 18 printed on the transparent sheet 12. The picture or design being made up of a grid pattern with grid squares that form the picture highlighted by heavy lines and color coded. The grids 25, 26 on the sheet are to be of the same size and generally similar to the specified size of grid 25, 26 pattern 17 of the plastic canvas sheet. The one side of the sheet of film has adhesive thereon and the opposite having the grid pattern. To carry out the process, the operator will remove the backing sheet and affix the sheet of film 12 to the plastic canvas 11 with the squares on it coextensive with the squares on the sheet of film 12. The operator will then cut out the picture or design 18, through the plastic canvas and film and after removing the film, stitch the picture through the grid openings in the plastic canvas, thereby easily and efficiently forming the needlework cut-out shape.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A craft kit comprising a sheet of transparent film sheet having adhesive on one side, covered with a removable backing sheet, and having horizontal and vertical rows of intersecting lines forming a grid with square spaces therebetween of a size similar to a grid of a sheet of plastic canvas, some of said grid on said film sheet being highlighted to define a picture on said sheet of transparent film sheet being adapted to overlie the corresponding parts of said grid on said plastic canvas sheet, said transparent film sheet being adapted to be used by removing said backing sheet from said transparent material, adhering said film to said plastic canvas sheet with the strands of said grid of said transparent film sheet overlying and coextensive with the strands of said grid on said plastic canvas sheet, cutting said plastic canvas to the shape of said picture, removing said transparent film sheet and stitching through said grid spaces in said plastic canvas with a heavy yarn, conforming to said picture, thereby doing a needlework design in accordance with said pattern on said transparent film sheet.

2. A method of doing stencil needlework comprising, providing a transparent film sheet with an adhesive coating on one side and a backing sheet covering the transparent film sheet on said one side, another side of said transparent film sheet having a grid pattern printed on it with the grids on the transparent film sheet of generally the same size as the grid pattern of the plastic canvas, some of said grids on said transparent film sheet being laid out in the form of a picture to be formed, removing said backing sheet, affixing said transparent sheet to said plastic canvas with said grid pattern of said transparent film sheet to said plastic canvas with said grid pattern of said transparent film sheet coextensive with said grid squares of said plastic canvas, cutting out said picture formed on said plastic canvas and said film, removing said transparent film sheet from said plastic canvas and replacing it on said backing sheet, stitching through said plastic canvas with a relatively heavy yarn according to said design.

3. The method recited in claim 2 wherein said grid pattern on said transparent film sheet is color coded for different colors of yarns that are to be used.

4. The method recited in claim 3 wherein said transparent film sheet may be made of Mylar.

5. The method recited in claim 3 wherein said color coding is made up of dashes, dots, x's, o's, and squares printed on the grid parts to denote various colors.

* * * * *